US012169693B2

(12) United States Patent
Lu

(10) Patent No.: US 12,169,693 B2
(45) Date of Patent: Dec. 17, 2024

(54) SYSTEM AND METHOD FOR GENERATING RESPONSES ASSOCIATED WITH NATURAL LANGUAGE INPUT

(71) Applicant: The Toronto-Dominion Bank, Toronto (CA)

(72) Inventor: Tsung-Jung Lu, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 295 days.

(21) Appl. No.: 17/370,409

(22) Filed: Jul. 8, 2021

(65) Prior Publication Data

US 2023/0011451 A1    Jan. 12, 2023

(51) Int. Cl.
| | |
|---|---|
| G06F 40/35 | (2020.01) |
| G06F 21/10 | (2013.01) |
| G06F 21/60 | (2013.01) |
| G06F 21/62 | (2013.01) |
| G06F 40/211 | (2020.01) |
| G06F 40/56 | (2020.01) |
| H04L 51/02 | (2022.01) |

(52) U.S. Cl.
CPC ............ *G06F 40/35* (2020.01); *G06F 21/602* (2013.01); *G06F 21/6254* (2013.01); *G06F 40/211* (2020.01); *G06F 40/56* (2020.01); *H04L 51/02* (2013.01); *G06F 21/107* (2023.08)

(58) Field of Classification Search
None
See application file for complete search history.

(56) References Cited

U.S. PATENT DOCUMENTS

| | | | |
|---|---|---|---|
| 9,350,735 B1* | 5/2016 | Parmar | .................. H04L 63/10 |
| 10,621,562 B2 | 4/2020 | Watson et al. | |
| 10,708,237 B2 | 7/2020 | Lurey et al. | |
| 10,721,225 B1* | 7/2020 | Baszucki | .............. A63F 13/795 |
| 10,949,153 B2 | 3/2021 | Viedt | |
| 2010/0185546 A1* | 7/2010 | Pollard | .................. G06Q 30/02 |
| | | | 705/26.1 |
| 2017/0277993 A1 | 9/2017 | Beaver et al. | |

(Continued)

OTHER PUBLICATIONS

Martinico: "Chatting About Data", https://project-archive.inf.ed.ac.uk/ug4/20191571/ug4_proj.pdf, publication date 2019.

*Primary Examiner* — Richa Sonifrank
(74) *Attorney, Agent, or Firm* — Rowand LLP

(57) ABSTRACT

A system comprises a communications module; at least one processor coupled with the communications module; and a memory coupled to the at least one processor and storing processor-executable instructions which, when executed by the at least one processor, configure the at least one processor to provide, via the communications module, a first encryption key of an encryption key pair to a client device; receive, via the communications module and from a conversation agent server, a fulfillment request based on a natural language input transmitted from the client device to the conversation agent server; determine that the fulfillment request includes a request for personal data; obtain the requested personal data; encrypt the personal data with a second encryption key of the encryption key pair; and provide, via the communications module and to the conversation agent server, the encrypted personal data for transmission to the client device.

14 Claims, 6 Drawing Sheets

(56) References Cited

U.S. PATENT DOCUMENTS

| | | |
|---|---|---|
| 2018/0115418 A1 | 4/2018 | Lakin |
| 2020/0137230 A1 | 4/2020 | Spohrer |
| 2020/0203012 A1 | 6/2020 | Kamath et al. |
| 2020/0220719 A1* | 7/2020 | Chaudhari ............ H04L 9/0822 |
| 2020/0244700 A1 | 7/2020 | Moon et al. |
| 2020/0295937 A1 | 9/2020 | Haider et al. |
| 2020/0322320 A1 | 10/2020 | Moon et al. |
| 2020/0344218 A1* | 10/2020 | Mulayin ............. H04L 63/0823 |
| 2021/0249002 A1* | 8/2021 | Ahmadidaneshashtiani ................ G06F 40/284 |

* cited by examiner

SYSTEM AND METHOD FOR GENERATING RESPONSES ASSOCIATED WITH NATURAL LANGUAGE INPUT

TECHNICAL FIELD

The present application relates to language processing systems and, in particular, to a system and method for generating responses associated with natural language input.

BACKGROUND

Chatbots, also known as artificial conversational entities, conversational bots, interactive agents, or the like, are computer programs configured to receive input from a user and to provide one or more responses so as to mimic human conversation with the user. Chatbots may be trained for targeted use scenarios. For example, chatbots may be trained for customer service scenarios to automate relatively simple yet relatively time-consuming tasks, such as providing information based on customer queries (e.g., providing information on products), conducting routine tasks (e.g., ordering goods), or the like. Chatbots may be developed and deployed on cloud-based computing platforms that include natural language processing and artificial intelligence functions and can conduct conversations with a user via auditory or textual methods.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
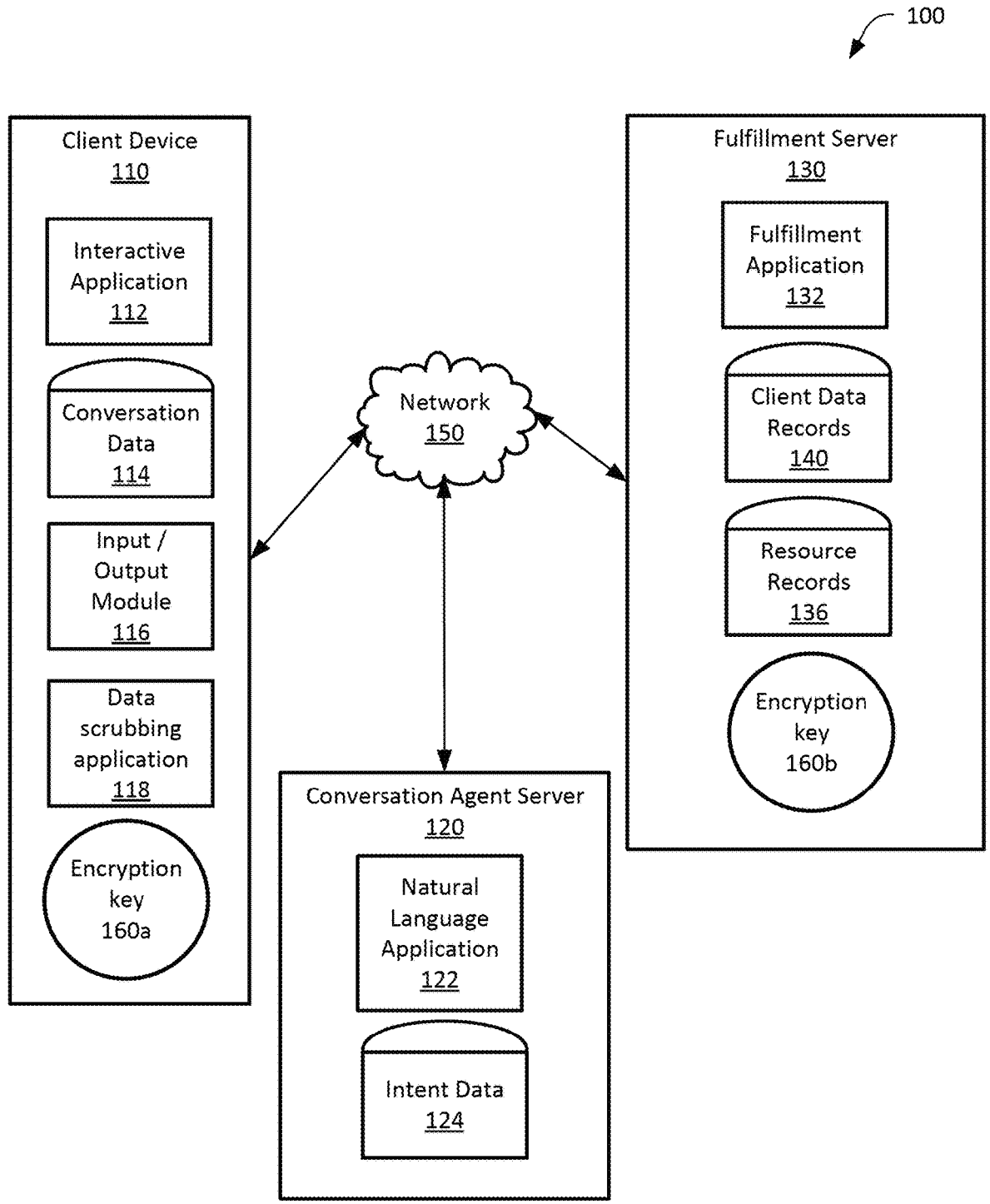
FIG. 1 illustrates, in block diagram form, a system of generating responses associated with natural language input, in accordance with an example of the present application.

In an aspect there is provided a system comprising a communications module; at least one processor coupled with the communications module; and a memory coupled to the at least one processor and storing processor-executable instructions which, when executed by the at least one processor, configure the at least one processor to provide, via the communications module, a first encryption key of an encryption key pair to a client device; receive, via the communications module and from a conversation agent server, a fulfillment request based on a natural language input transmitted from the client device to the conversation agent server; determine that the fulfillment request includes a request for personal data; obtain the requested personal data; encrypt the personal data with a second encryption key of the encryption key pair; and provide, via the communications module and to the conversation agent server, the encrypted personal data for transmission to the client device.

In one or more embodiments, the encrypted personal data is in a format inaccessible by the conversation agent server.

In one or more embodiments, the fulfillment request includes at least an intent and a parameter, the intent and the parameter identified from the natural language input by the conversation agent server.

In one or more embodiments, when determining that the fulfillment request includes the request for personal data, the processor-executable instructions, when executed by the at least one processor, configure the at least one processor to analyze at least one of the intent and the parameter to determine that the fulfillment request includes the request for personal data.

In one or more embodiments, the request for personal data includes at least one of a request for an account balance or a request for an account number.

In one or more embodiments, the processor-executable instructions, when executed by the at least one processor, configure the at least one processor to provide, via the communications module, a data scrubbing application to the client device; and prior to transmitting the natural language input from the client device to the conversation agent server, analyze, using the data scrubbing application, the natural language input to determine that the natural language input includes personal data.

In one or more embodiments, the processor-executable instructions, when executed by the at least one processor, configure the at least one processor to determine that the natural language input includes personal data; responsive to determining that the natural language input includes personal data, reject the natural language input; and output, at the client device, a message requesting natural language input that does not include the personal data.

In one or more embodiments, determining that the natural language input includes personal data includes determining that the natural language input includes a plurality of numbers.

In one or more embodiments, the processor-executable instructions, when executed by the at least one processor, configure the at least one processor to determine that the natural language input does not include personal data; and responsive to determining that the natural language input does not include personal data, transmit, via the communications module, the natural language input from the client device to the conversation agent server.

In one or more embodiments, the processor-executable instructions, when executed by the at least one processor, configure the at least one processor to receive, at the client device and from the conversation agent server, a response to the natural language input, the response including the encrypted personal data; decrypt, using the first encryption key of the encryption key pair, the encrypted personal data; and output, at the client device, the decrypted personal data.

According to another aspect there is provided a computer-implemented method comprising providing a first encryption key of an encryption key pair to a client device; receiving, from a conversation agent server, a fulfillment request based on a natural language input transmitted from the client device to the conversation agent server; determining that the fulfillment request includes a request for personal data; obtaining the requested personal data; encrypting the personal data with a second encryption key of the encryption key pair; and providing the encrypted personal data to the conversation agent server for transmission to the client device.

In one or more embodiments, the encrypted personal data is in a format inaccessible by the conversation agent server.

In one or more embodiments, the fulfillment request includes at least an intent and a parameter, the intent and the parameter identified from the natural language input by the conversation agent server.

In one or more embodiments, determining that the fulfillment request includes the request for personal data includes analyzing at least one of the intent and the parameter to determine that the fulfillment request includes the request for personal data.

In one or more embodiments, the request for personal data includes at least one of a request for an account balance or a request for an account number.

In one or more embodiments, the method further comprises providing a data scrubbing application to the client device; and prior to transmitting the natural language input from the client device to the conversation agent server, analyzing, using the data scrubbing application, the natural language input to determine that the natural language input includes personal data.

In one or more embodiments, the method further comprises determining that the natural language input includes personal data; responsive to determining that the natural language input includes personal data, rejecting the natural language input; and outputting, at the client device, a message requesting natural language input that does not include the personal data.

In one or more embodiments, determining that the natural language input includes personal data includes determining that the natural language input includes a plurality of numbers.

In one or more embodiments, the method further comprises determining that the natural language input does not include personal data; and responsive to determining that the natural language input does not include personal data, transmitting the natural language input from the client device to the conversation agent server.

According to another aspect there is provided a non-transitory computer readable storage medium comprising computer-executable instructions which, when executed, configure at least one processor to provide a first encryption key of an encryption key pair to a client device; receive, from a conversation agent server, a fulfillment request based on a natural language input transmitted from the client device to the conversation agent server; determine that the fulfillment request includes a request for personal data; obtain the requested personal data; encrypt the personal data with a second encryption key of the encryption key pair; and provide the encrypted personal data to the conversation agent server for transmission to the client device.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

It may be appreciated that while examples described herein include data or fulfillment servers associated with banking institutions, the systems and methods described herein may also be applicable to data or fulfillment servers associated with non-banking institutions which store and process other types of personal data including personal data. For example, non-banking data servers may include government operated computer servers for administering taxation programs, retail company servers for administering customer loyalty/incentive programs, or the like, where misappropriation of data at the data servers may be perilous to a user's identity or considered a breach of a user's privacy.

Cloud-based natural language processing software packages may be used to develop chatbots. In some examples, a chatbot may be configured to receive input and to provide one or more responses so as to mimic human conversation with a user. The received input and the provided response may be text-based or may be voice-based. Google Dialog Flow™ is one example of a cloud-based natural language processing software package. Other examples of natural language processing software packages may include spaCy™, Apache OpenNLP™, Stanford NLP™, or the like. It may be appreciated that other examples of cloud-based natural language processing software packages may be contemplated. In some examples, natural language processing software packages may be one or a combination of a rules-based chatbot or a machine learning based chatbot.

In some examples, a computing server (e.g., conversation agent server) may include memory storing a natural language processing software package having instructions that, when executed, configure a processor of the computing server to conduct operations for maintaining conversation context of user interactions. For example, if a user provides an ambiguous input, the processor may detect the ambiguous input and place the natural language processing software package in a state (e.g., conversation context) associated with prompting the user for clarification and for receiving/handling subsequent user input to address the detected ambiguity.

In some examples, the conversation agent server may be configured to transmit queries to other computing servers (e.g., fulfillment servers or data servers) via application programming interfaces (APIs). The conversation agent server may request access to data from data servers or request responses to queries where access to data stored on a fulfillment server may be required. Subsequently, data or responses may be provided via the conversation agent server to the client device.

A conversation agent server may be trained for a particular target use. For example, an institution may provide large volumes of potential natural language input and associate such natural language input with at least one intent. In some examples, an intent may be associated with a group of input (e.g., natural language input) having similar meaning. The respective inputs of the group may use different words or sentence structure but may have substantially the same meaning and be associated with a common intent.

Further, the institution that is training the conversation agent server may associate such natural language input with a response or initiate operations associated with such input. For example, a banking institution may train a conversation agent server to provide a banking account chatbot for banking clients. The banking chatbot may be trained to provide responses or initiate banking operations in response to natural language input, such as "What is the balance of my chequing bank account as of June 30?" or "Please transfer two thousand dollars from my savings bank account to my registered investment account." Users providing natural language input may utilize colloquial or free-form language.

In some examples, the conversation agent server executing the above-described natural language processing software package may be a third party server. The third party server may be operated by an entity that is apart from the banking institution. Upon receiving a user input, the conversation agent server may determine a user intent, parameterize the user input, or may interact with the banking institution to request access to personal data associated with a user. In some examples, personal data can include names, addresses, social security numbers (e.g., taxpayer identification numbers), bank account balances, or the like. The personal data may include data that, if misappropriated by an unscrupulous entity, may be used for conducting fraudulent activity that may be injurious to bank account users.

As third party servers may be operated by vendor entities that are separate from banking institutions and that may not be bound by confidentiality or privacy laws, regulations, or rules that the banking institutions may be bound to, it may be desirable to provide systems, devices, and methods to receive user input and to provide responses based on personal data access that ameliorate confidentiality or privacy concerns associated with conversation agent server systems.

Reference is made to FIG. 1, which illustrates, in block diagram form, a system 100 of generating responses associated with natural language input, in accordance with an example of the present application. Example personal data may include data associated with banking accounts or resource records. However, it may be understood that personal data may include other types of data in non-banking contexts, the misappropriation of which by an unscrupulous entity may be injurious to a user associated with that personal data.

The system 100 includes a client device 110, a conversation agent server 120, and a fulfillment server 130. The system 100 may also include a network 150. The client device 110, the conversation agent server 120, and the fulfillment server 130 may be configured to communicate over the network with one another or with any other similar computing device. The network 150 may include one or a combination of interconnected wired or wireless networks, including the Internet, local area networks, wireless area networks, or the like.

The client device 110 may be associated with a banking user. The client device 110 may be configured to receive input and may be configured to interact with the banking user. For example, the client device 110 may include an interactive application 112 having processor executable instructions stored in memory that, when executed, cause a processor to conduct operations described herein for receiving user input or interacting with a banking user. In illustrative examples described herein, the interactive application 112 may be a mobile banking application associated with the fulfillment server 130 (e.g., banking institution server). The interactive application 112 may receive input from a banking user and may conduct actions or generate responses in response to banking user input. It may be appreciated that other types of applications may be contemplated. The client device 110 may also include conversation data 114 stored in memory. Conversation data 114 may include data associated with natural language input received from a user of the client device 110. The conversation data 114 can include user intents or parameters that are based on natural language input.

The banking user may interact with the client device 110 via an input/output module 116. For example, the input/output module 116 may include a touch screen display for displaying a user interface and a touch screen interface for receiving motion or touch input from the banking user. The input/output module 116 may include an acoustic input transducer (e.g., microphone) and a loudspeaker. The acoustic input transducer may receive acoustic input from the banking user and the loudspeaker may generate and provide an acoustic output to the banking user. Other examples of input/output modules for receiving user input and providing responses may be contemplated.

In some examples, the input/output module 116 may receive natural language input. Natural language input may describe language used among two or more people during a conversation, in contrast to structured communication protocol for transmission and receipt of data among computing devices. For example, existing computing device interfaces may require structured and predictable data input for conducting operations. Such structured and predictable data input schemes may make use of unnatural interfaces and may be challenging to use. For instance, when a user fails to exactly follow the structured data input schemes, the input may not be recognized by a computer. On the other hand, natural language input may be syntax agnostic. For instance, a banking user may provide input such as "What is company A's stock worth today?" Another banking user may provide varied input for seeking a response to a substantially similar question: "What's the price of the company stock today?" Accordingly, it may be desirable to provide systems and methods for processing natural language user input. That is, it may be desirable to provide systems and methods for managing nuances of language.

The client device 110 may additionally include a data scrubbing application 118 having processor executable instructions stored in memory that, when executed, cause a processor to conduct operations described herein for analyzing the natural language user input to determine whether or not the natural language input includes personal data. Although the data scrubbing application 118 is illustrated as being separate from the interactive application 112, in one or more embodiments the data scrubbing application may be included with or provided with the interactive application 112 and may be associated with the fulfillment server 130.

The conversation agent server 120 may be a single server, multiple servers, a server farm, or any other such arrangement of computing devices to implement computing server-like functionality. The conversation agent server includes one or more processors, memory, and a communication module for providing communications capabilities with other computing devices. As an illustrating example, the conversation agent server 120 may be a cloud-based natural language software processing server, such as a Google Dialogflow™ based computing device for receiving input and providing responses based on the received input. Other example cloud-based natural language processing software packages may be contemplated.

The conversation agent server 120 may include a natural language application 122 for processing natural language input and intent data 124. The natural language application 122 may be a natural language processing software application used for developing chatbots. A chatbot may be a computer program or an artificial intelligence application for conducting a conversation via auditory or textual methods. The chatbot may be designed to simulate or mimic human conversation with a user.

In some examples, natural language processing software applications may include operations for receiving natural language input, parsing the natural language input, and generating a response to the user associated with the natural language input. To train natural language processing software applications for interacting with user input, in some examples, the natural language application 122 may include operations for creating one or more user intents that map to responses. For instance, a defined user intent may be associated with or mapped to one or more examples of user utterances or user inputs. The created intents and associated training responses may be stored as intent data 124. It may be appreciated that the intent data 124 may include other data associated with operations of the natural language application 122.

As an illustrating example, the natural language application 122 may be trained to associate an "account balance" intent with an operation to check a value of a banking account. Further, training phrases that may be associated with the "account balance" intent may include "balance", "value", "account total", or the like. Accordingly, when a banking user provides a natural language input such as "What is the balance of my chequing account today?" the natural language application 122 may include operations for identifying the "account balance" intent.

Further, the natural language application 122 may include operations for identifying one or more parameters associated with the user input. Continuing with the present example, the natural language application 122 may include operations for identifying "chequing account" and "today" as parameters. Further, the natural language application 122 may also include operations for interacting with a fulfillment server 130 to retrieve or request information for generating a response to the natural language input. In the present example, the natural language application 122 may include an application programming interface (APIs) or a fulfillment interface for interacting with the fulfillment server 130. That is, the natural language application 122 may include operations for generating and transmitting a fulfillment request to the fulfillment server 130. As will be described in more detail below, the natural language application 122 may receive encrypted personal data from the fulfillment server 130 and may, in turn, transmit the encrypted personal data to the client device 110.

The fulfillment server 130 may be a single server, multiple servers, a server farm, or any other such arrangement of computing devices to implement computing server-like functionality. Fulfillment server 130 includes one or more processors, memory, and a communication module for providing communications capability with other computing devices. As an illustrating example, the fulfilment server 130 may be associated with a banking institution at which banking account users have a banking or investment account. In other examples, the fulfilment server 130 may be associated with non-banking institutions and may store personal data of other types.

The fulfillment server 130 includes a fulfillment application 132 for interacting with the client device 110 and/or the conversation agent server 120 to receive queries associated with identified banking account users and to generate responses to the received queries. For example, when a banking user associated with the client device 110 submits an electronic payment request, the fulfillment server 130 may identify a banking account associated with the banking user and conduct a payment action associated with the electronic payment request. In another example, when the conversation agent server 120 submits a fulfillment request to the fulfillment server 130, the fulfillment server 130 may identify a client data record associated with a banking user and provide data associated with the fulfillment request to the conversation agent server 120.

The fulfilment server 130 may include client data records 140. The client data records 140 may include one or more data records associated with a banking user, where the data records may include data associated with savings bank accounts, chequing bank accounts, investment accounts, lending products (e.g., line-of-credit account, mortgage, etc.), credit card accounts, or the like. Further, the respective data records may include personal data associated with respective banking users. Personal data includes types of data which may be considered confidential and which if misappropriated by an unscrupulous entity may be injurious to respective banking users. For example, personal data may include account balances, credit balances, account numbers, credit card numbers, legal names, addresses, social security numbers (e.g., taxpayer identification number), employment history data, birth dates, or the like.

The fulfilment server 130 may include resource records 136. The resource records 136 may track resources, including currency, monetary value, digital assets, tokens, precious metals, among other examples. In some examples, a client data record may be associated with a resource record and can be a data structure for tracking a running balance of money or investment instruments being managed by the banking institution. The client data record can include information associating resources with a bank account of a banking user.

In the present example, the conversation agent server 120 may include the natural language application 122 having instructions that, when executed, include operations for: (i) receiving natural language input from the client device 110; (ii) generating and transmitting a fulfillment request to the fulfillment server 130 to query personal data for generating a response to the natural language input; (iii) receiving a response indication or the queried personal data from the fulfilment server 130; and (iv) generating and transmitting a response based on the queried personal data to the client device 110.

Because the personal data may include data that is considered confidential and because the conversation agent server 120 may be operated by a third party entity that is separate from the fulfillment server 130, it may be desirable to provide systems and methods to minimize risk of personal data breaches associated with transmitting personal data via the conversation agent server 120 to the client device 110. The system 100 described herein provides systems and methods for generating responses associated with natural language input.

To minimize providing personal data to the conversation agent server 120 that may be operated by a third party entity to prevent misappropriation of personal data by an unscrupulous entity having access to the conversation agent server 120, an encryption key pair may be used by the provided systems and methods described herein. For example, the fulfillment server 130 may generate an encryption key pair 160a, 160b. A first encryption key 160a of the encryption key pair 160a, 160b may be provided to and stored by the client device 110. A second encryption key 160b of the encryption key pair 160a, 160b may be stored by the fulfillment server 130. The encryption key pair 160a, 160b may be used to encrypt/decrypt personal data such that the personal data is in a format inaccessible by the conversation agent server 120.

Figure 2:
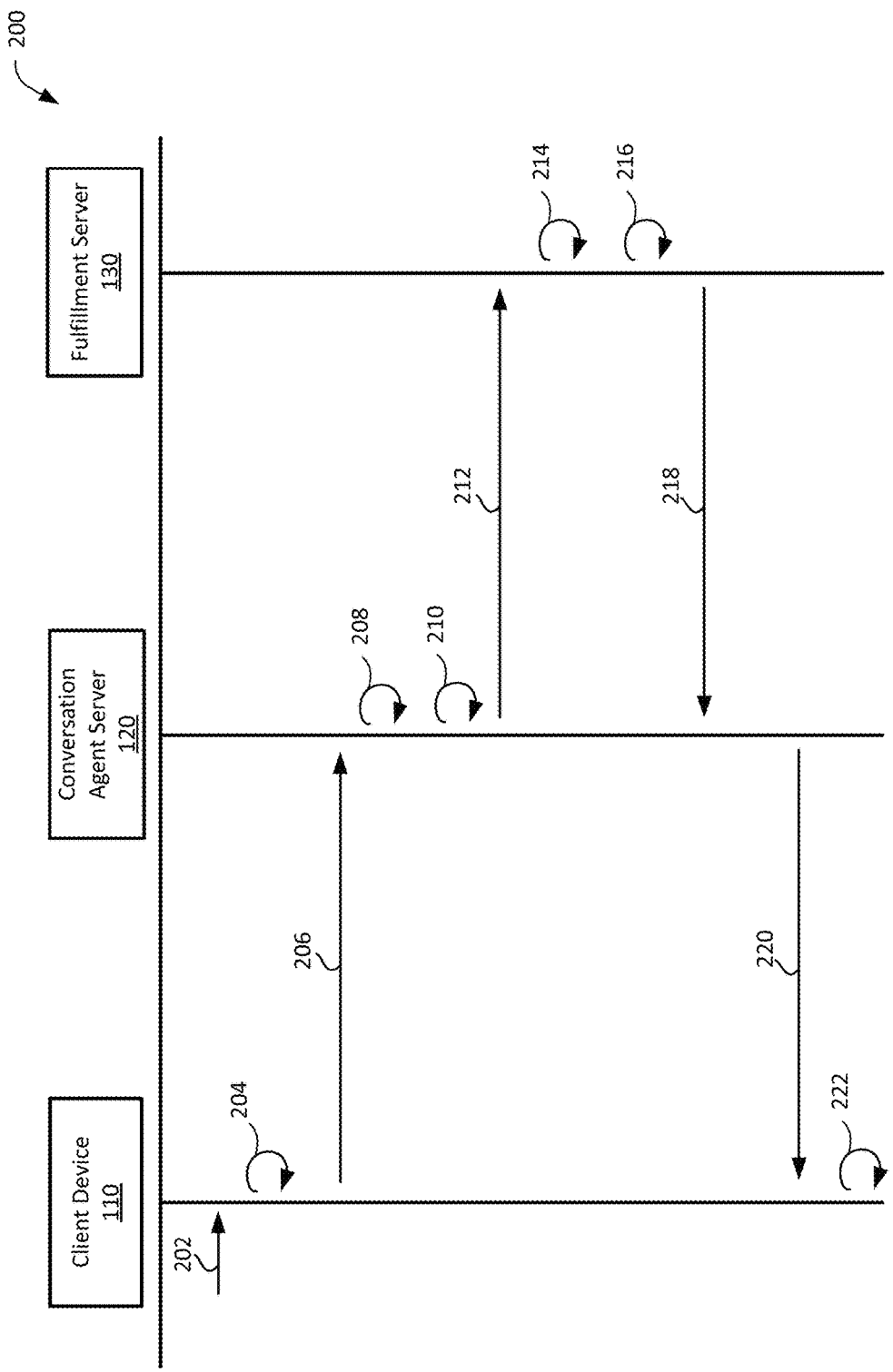
FIG. 2 illustrates a signal diagram illustrating exchanges among computing devices for generating responses associated with natural language input, in accordance with an example of the present application.

Reference is made to FIG. 2, which illustrates a signal diagram 200 illustrating exchanges among computing devices for generating responses associated with natural language input, in accordance with an example of the present application. The signal diagram 200 includes the example client device 110, the conversation agent server 120, and the fulfillment server 130 of FIG. 1.

The signal diagram 200 illustrates operations that may be implemented, at least in part, through processor executable instructions stored at one or more of the computing devices. The operations may be carried out by one or more processors of the respective devices, servers, or applications thereon. Further, the signal diagram 200 illustrates operations or exchanges associated with particular computing servers or devices. It may be understood that although a particular operation may be illustrated as being conducted at one particular device, it may be contemplated that the particular operation may be conducted alternatively at another device. For example, in a scenario where user input received at the client device 110 may be acoustic input, operations for converting speech-to-text to provide a textual natural language input may be conducted at the client device 110 or the conversation agent server 120.

To illustrate example operations of the present application, the client device 110 may be associated with a bank user and the interactive application 112 (FIG. 1) may be a mobile banking application associated with the fulfillment server 130 (e.g., banking institution server). The interactive application 112 may include an input interface for receiving user input such that the bank user may request banking information associated with a bank account or conduct banking transactions based on the user input.

At operation 202, the client device 110 receives natural language input from the bank user. The natural language input may be colloquial language input and may be provided as spoken acoustic input or as textual input. In some examples, natural language input may be syntax agnostic such that there may be two or more variant ways of expressing a particular user intent. In some examples, the client device 110 may receive spoken acoustic input via a microphone and conduct speech-to-text operations to generate textual input. In some examples, the client device 110 may receive textual input via a physical keyboard device or a virtual keyboard device displayed on a touchscreen display.

In some scenarios, the client device 110 may authenticate the bank user, such as by requesting login credentials or a password. Once the bank user is authorized, the client device 110 may associate the natural language input with a user identifier. For example, the user identifier may be a client's name or a banking account number associated with the bank user.

The client device 110 receives natural language input. In a first example, the client device 110 may receive the natural language input: "What is the balance of my account?"

In a second example, the client device 110 may receive the natural language input "How much remaining credit do I currently have on my credit card?"

In a third example, the client device 110 may receive the natural language input "Please transfer $2,000 from my chequing account to my investment account".

It may be desirable to minimize providing personal data to the conversation agent server 120 that may be operated by a third party entity to prevent misappropriation of personal data by an unscrupulous entity having access to the conversation agent server 120. Thus, it may be desirable to prevent exposure of personal data by conducting operations associated with personal data at the client device 110.

As such, in this embodiment, at operation 204, the data scrubbing application 118 resident on the client device 110 analyzes the natural language input to determine if the natural language input includes personal data. In the scenario that the received natural language input is in textual format, the textual format may be analyzed by the data scrubbing application. In the scenario that the received natural language input is an acoustic input (e.g., spoken input received from the bank user), the client device 110 may conduct operations to convert the acoustic input into textual format and the textual format may be analyzed by the data scrubbing application 118.

For example, the data scrubbing application 118 may analyze the natural language input to determine if the natural language input includes a plurality of numbers that may be a social security number, a credit card number, an account number, etc.

Responsive to determining that the natural language input includes personal data, the data scrubbing application 118 may cause the client device 110 to output a message requesting natural language input that does include the personal data.

For example, the client device 110 may receive natural language input "What is the balance of credit card number 1234 5678 9000 0000." The data scrubbing application 118 may analyze the natural language input and may identify that a plurality of numbers exist and that this is likely to represent personal data such as a credit card number. As such, the data scrubbing application 118 may cause the client device 110 to output a message such as "Your request includes personal data that is not required to fulfill your request. Please ask the same question, but without the personal data."

Responsive to determining that the natural language input does not include personal data, the data scrubbing application 118 permits the natural language input and operation 206 is performed.

At operation 206, the client device 110 transmits the received natural language input to the conversation agent server 120. As mentioned, in the scenario that the received natural language input is in textual format, the textual format may be transmitted to the conversation agent server 120. In the scenario that the received natural language input is an acoustic input (e.g., spoken input received from the bank user), the client device 110 may conduct operations to convert the acoustic input into textual format and, subsequently, transmit the textual format to the conversation agent server 120. In some examples, for example when the data scrubbing application 118 is not required or is not resident on the client device 110, the client device 110 may transmit the acoustic input to the conversation agent server 120 and, upon receipt, the conversation agent server 120 may conduct operations to convert the acoustic input into textual format.

At operation 208, the conversation agent server 120 receives the natural language input and conducts intent recognition and parameterization based on the natural language input.

In the first example of "What is the balance of my account", the conversation agent server 120 may identify that the natural language input is associated with an "account balance" intent. Further, the conversation agent server 120 may identify an "account" as a parameter.

In the second example of "How much remaining credit do I currently have on my credit card?", the conversation agent server 120 may identify that the input is associated with a "credit balance" intent. Further, the conversation agent server 120 may identify "credit card" as a parameter. In addition, the conversation agent server 120 may identify "today" as a parameter based on the term "currently" from the input.

In the third example of "Please transfer $2000 from my chequing account to my investment account", the conversation agent server 120 may identify that the input is associated with a "transfer" intent and may identify "$2,000" (e.g., amount), "chequing account" (e.g., source account), and "investment account" (e.g., target account) as parameters. In some examples, operations associated with identifying an intent and at least one parameter from the natural language input may be syntax agnostic. That is, user input may be expressed in other ways and may correspond to substantially similar example intents or parameters.

At operation 210, the conversation agent server 120 may generate a fulfillment request that includes a request for personal data at the fulfillment server 130. In some examples, the personal data may be associated with client data records 140 (FIG. 1) or resource records 136 (FIG. 1) stored at the fulfillment server 130. Further, the personal data being sought may be associated with a user identifier of the bank user from whom the natural language input was received.

Continuing with the first example of "What is the balance of my account?", the conversation agent server 120 may generate a fulfillment request to request the balance of the user's bank account. Information regarding the balance of the user's bank account may be considered personal data.

In the second example of "How much remaining credit do I currently have on my credit card?", the conversation agent server 120 may generate a fulfillment request to request the remaining credit on the credit card. Information regarding remaining credit on the credit card may be considered personal data.

In the third example of "Please transfer $2,000 from my chequing account to my investment account", the conversation agent server 120 may generate a fulfillment request to transfer $2000 to the investment account.

At operation 212, the conversation agent server 120 transmits, to the fulfillment server 130, the fulfillment request.

At operation 214, the fulfillment server 130 may determine that the fulfillment request includes a request for personal data and may obtain the personal data. For example, in the first example of "What is the balance of my account?", the fulfillment server 130 may determine that the fulfillment request includes a request for personal data and may obtain a bank account balance of the bank account of the user.

In the second example of "How much remaining credit do I currently have on my credit card?", the fulfillment server 130 may determine that the fulfillment request includes a request for personal data and may obtain the remaining credit card amount on the credit card of the user.

In the third example of "Please transfer $2000 from my chequing account to my investment account", the fulfillment server 130 may determine that the fulfillment request includes a transfer request and thus does not include a request for personal data. The fulfillment server 130 may perform one or more steps to transfer $2000 from the bank account of the user to the investment account of the user. For example, the fulfillment server 130 may update data records to transfer $2000 from the bank account to the investment account of the user.

As described, it may be desirable to minimize providing personal data to the conversation agent server 120 that may be operated by a third party entity to prevent misappropriation of personal data by an unscrupulous entity having access to the conversation agent server 120. Thus, it may be desirable to prevent exposure of personal data by conducting operations associated with personal data at the fulfillment server 130.

At operation 216, the fulfillment server 130 encrypts the obtained personal data with a second encryption key of the encryption key pair. In the first example of "What is the balance of my account?", the fulfillment server 130 determines that the request includes a request for personal data and as such the obtained balance of the account is encrypted using the second encryption key of the encryption key pair.

In the second example of "How much remaining credit do I currently have on my credit card?", the fulfillment server 130 determines that the request includes a request for personal data and as such the obtained remaining credit is encrypted using the second encryption key of the encryption key pair.

In the third example of "Please transfer $2000 from my chequing account to my investment account", the fulfillment server 130 determines that the request does not include a request for personal data and as such does not encrypt the response to the fulfillment request.

At operation 218, the fulfillment server 130 transmits, to the conversation agent server 120, a response to the fulfillment request. In the first example of "What is the balance of my account?", the response to the fulfillment request includes the encrypted personal data, that is, the encrypted data indicating the balance of the account.

In the second example of "How much remaining credit do I have on my credit card?", the response to the fulfillment request includes the encrypted personal data, that is, encrypted data indicating the remaining credit.

In the third example of "Please transfer $2000 from my chequing account to my investment account", the response to the fulfillment request includes an indication that the transfer has been completed by the fulfillment server 130.

At operation 220, the conversation agent server 120 transmits the response to the fulfillment request to the client device 110. In the first and second examples, the encrypted personal data is inaccessible by the conversation agent server 120 and as such the conversation agent server 120 transmits the encrypted personal data to the client device 110. As such, the conversation agent server 120 is relied upon solely for intent recognition and parameterization of the received natural input. Since the response to any fulfillment request that includes a request for personal data includes the personal data in an encrypted format that is inaccessible by the conversation agent server 120, the conversation agent server 120 is used to relay or transmit the encrypted personal data to the client device 110. Put another way, the conversation agent server 120 is relied upon solely for intent recognition and parameterization of the received natural input.

At operation 222, the client device 110 decrypts the encrypted personal data using the first encryption key of the encryption key pair. The client device 110 outputs the decrypted data as a response to the natural language input. The output may include, for example, a notification displayed on a display screen of the client device 110 and/or may include audio output by a microphone of the client device 110.

It will be appreciated that in examples where the fulfillment request does not include a request for personal data, decryption is not required and as such the client device 110 outputs the response received from the conversation agent server 120.

Figure 3:
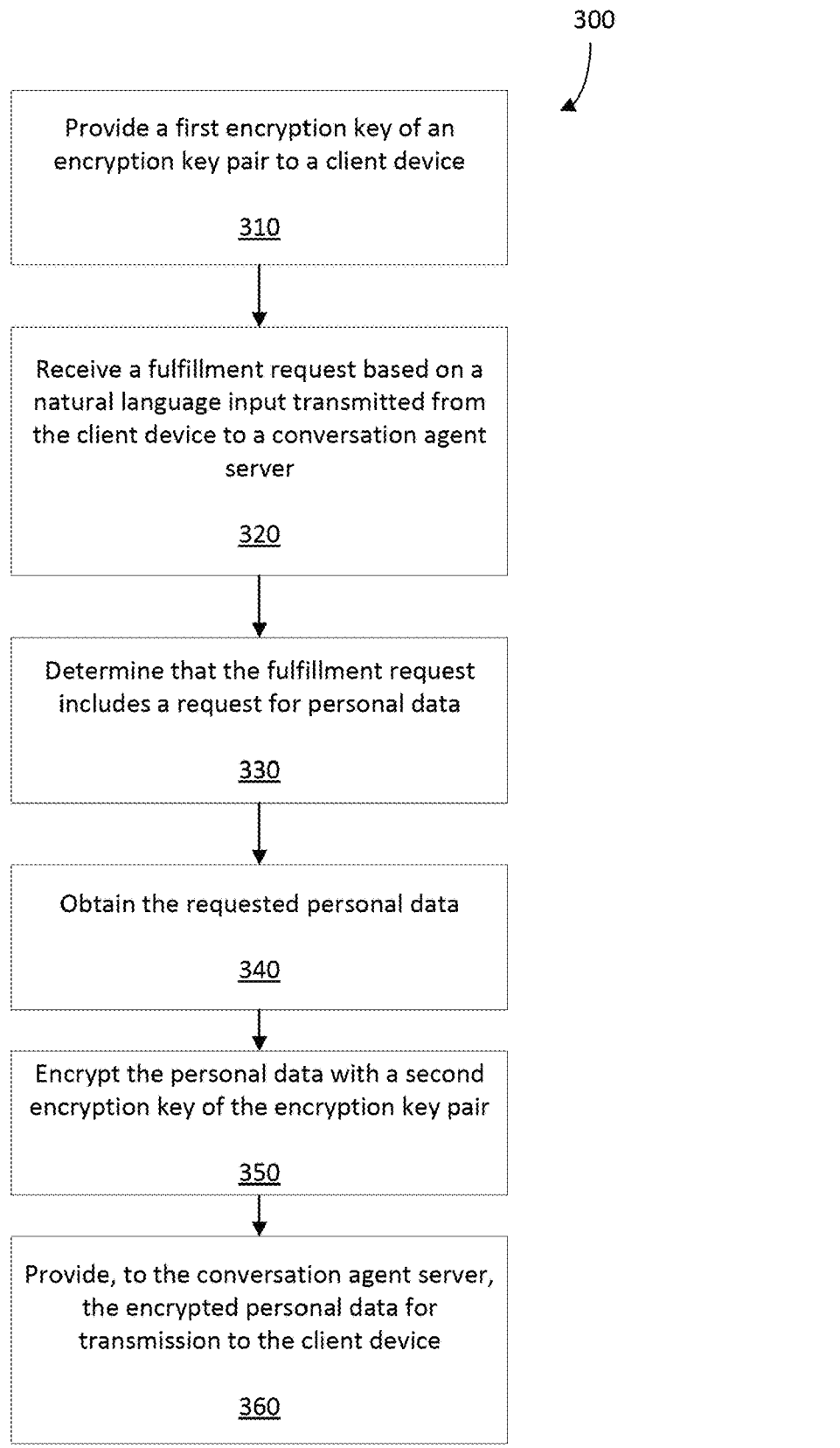
FIG. 3 is a flowchart illustrating a method of generating responses associated with natural language input, in accordance with an example of the present application.

Reference is made to FIG. 3, which illustrates, in flowchart form, a method 300 of generating a response associated with a natural language input, in accordance with an example of the present application. The method 300 includes operations that may be carried out by one or more processors of the client device 110 and/or the fulfillment server 130 (FIG. 1). For example, the method 300 may be implemented, at least in part, through processor executable instructions associated with the interactive application 112 (FIG. 1). In some examples, one or more operations may be implemented via processor executable instructions in other applications or in an operating system stored and executed on the client device 110 and/or fulfillment server 130.

The client device 110 may be associated with a bank customer user and the interactive application 112 (FIG. 1) may be a mobile banking application configured to interact with the fulfillment server 130 (FIG. 1). The fulfillment server 130 may be a banking institution server. The interactive application 112 may include an input interface for receiving user input. The input interface may include a microphone for receiving acoustic input and/or a touchscreen display for receiving textual input. Other examples of input interfaces are contemplated.

In some examples, the client device 110 may authenticate the bank customer user by requesting that authorization details be provided to the interactive application 112. For example, the authorization details may include a client number, an account number, a password, or the like.

During method 300, a first encryption key of an encryption key pair is provided to the client device 110 (step 310). The encryption key pair may be generated on the client side, that is, by the client device 110 or at the server side, that is, by the fulfillment server 130. In this embodiment, the encryption key pair is generated by the fulfillment server 130 and as such the first encryption key is sent from the fulfillment server 130 to the client device 110.

The first encryption key may be sent to the client device 110 responsive to the interactive application 112 being downloaded on the client device 110. Alternatively, each time the client device 110 authenticates the bank customer user at the interactive application 112, the encryption key pair may be generated and the first encryption key may be sent to the client device 110.

Within the interactive application 112, the bank customer user may provide an acoustic input (e.g., spoken words) or alphanumeric input (e.g., typed words) and the client device 110 may receive the input. For example, the client device 110 may receive the input "What is my credit card balance?"

The client device 110 transmits, to the conversation agent server 120, the natural language input "What is my credit card balance?" The example natural language input may be syntax agnostic. That is, another user wishing to provide a substantially similar query may provide an alternate natural language input in another way: "How much have I spent on my credit card this month?"

In some examples, the natural language input may be associated with a user identifier. That is, the client device 110 may associate a user identifier of the bank customer user with the received natural language input. In the present example, the natural language input may be a query on personal data of a data record corresponding to the user identifier. That is, the input "What is my credit card balance?" may be a query by the bank customer user of a credit card account associated with that user.

In some examples where the natural language input is acoustic or speech-based input, the client device 110 may execute operations to conduct speech-to-text operations to provide a text-based natural language input. It may be appreciated that speech-to-text operations may be conducted at any one of or a combination of the client device 110 or the conversation agent server 120.

The conversation agent server 120 receives the natural language input and identifies at least an intent and at least one parameter. In the present example, the intent may be "balance" and the at least one parameter may include "account=credit card". The conversation agent server 120 generates, based on the intent and at least one parameter, a fulfillment request. The fulfillment request includes at least the intent and the at least one parameter.

The conversation agent server 120 sends the fulfillment request to the fulfillment server 130.

The fulfillment server 130 receives, from the conversation agent server 120, the fulfillment request based on the natural language input transmitted from the client device 110 to the conversation agent server 120 (step 320).

The fulfillment server 130 analyzes the fulfillment request to determine if the fulfillment request includes a request for personal data (step 330).

In one or more embodiments, the fulfillment server 130 may maintain a list of intents and corresponding parameters that are determined to be requests for personal data. For example, the list may include an intent such as "balance" and corresponding parameters such as "account=credit card" and as such the fulfillment server 130 may use the list to determine if the request includes the request for personal data. The list may additionally include a list of intents and corresponding parameters that are determined to not be requests for personal data. For example, the list may include an intent such as "stock price" and corresponding parameters such as "stock=ABC". As such, when a fulfillment request is a request for the stock price of stock ticker ABC, the fulfillment server 130 may determine that the request is not a request for personal data.

In the present example, the fulfillment request includes the intent "balance" and the at least one parameter may include "account=credit card" and as such, using the list, the fulfillment server 130 determines that the fulfillment request includes a request for personal data.

The fulfillment server 130 obtains the requested personal data (step 340).

In this embodiment, the fulfillment server may obtain the requested personal data from the client data records 140. For example, the fulfillment server 130 may identify one or more client data records 140 associated with the banking user and may obtain the requested personal data from the one or more client data records 140. In the present example, the fulfillment server 130 may obtain the credit card balance of the user.

The fulfillment server 130 encrypts the requested personal data using the second encryption key of the encryption key pair (step 350).

Using the second encryption key of the encryption key pair, the fulfillment server 130 encrypts the requested personal data such that the personal data is in a format inaccessible by the conversation agent server 120.

The fulfillment server 130 provides, to the conversation agent server 120, the encrypted personal data for transmission to the client device 110 (step 360). The fulfillment server 130 provides the encrypted personal data to the conversation agent server 120 in the format that is inaccessible by the conversation agent server 120.

The conversation agent server 120 receives the encrypted personal data from the fulfillment server 130 as a response to the fulfillment request. Since the encrypted personal data is received in the format inaccessible by the conversation agent server 120, the conversation agent server 120 is relied upon solely for intent recognition and parameterization of the received natural input and the conversation agent server 120 is prevented from exposure to the personal data.

The conversation agent server 120 communicates the encrypted personal data to the client device 110 as a response to the natural language input.

The client device 110 decrypts, using the first encryption key of the encryption key pair, the encrypted personal data. The client device 110 outputs the decrypted personal data as a response to the natural language input. For example, the client device 110 may display the decrypted personal data on a display screen and/or may output the decrypted personal data as audio. In the present example, the client device 110 may display the credit card balance of the user and/or may output the credit card balance of the user as audio.

During step 340, the fulfillment server 130 may determine that the fulfillment request does not include a request for personal data. Responsive to determining that the fulfillment request does not include the request for personal data, the fulfillment server 130 obtains the requested data and sends the requested data to the fulfillment server 130 for transmission to the client device 110. In this scenario, since the fulfillment request does not include a request for personal data, encryption is not required.

The operations of method 300 may be executed by the fulfillment server 130 and/or the client device 110 to minimize providing personal data to the conversation agent server 120 that may be operated by a third party entity to prevent misappropriation of personal data by an unscrupulous entity having access to the conversation agent server 120. Specifically, the operations of method 300 encrypt personal data, obtained in response to a fulfillment request based on a natural language input transmitted from the client device 110 to the conversation agent server 120, in a format inaccessible by the conversation agent server 120.

As mentioned, a data scrubbing application may be provided to the client device 110 to analyze the natural language input to determine if the natural language input includes personal data that should not be provided to the conversation agent server 120.

Figure 4:
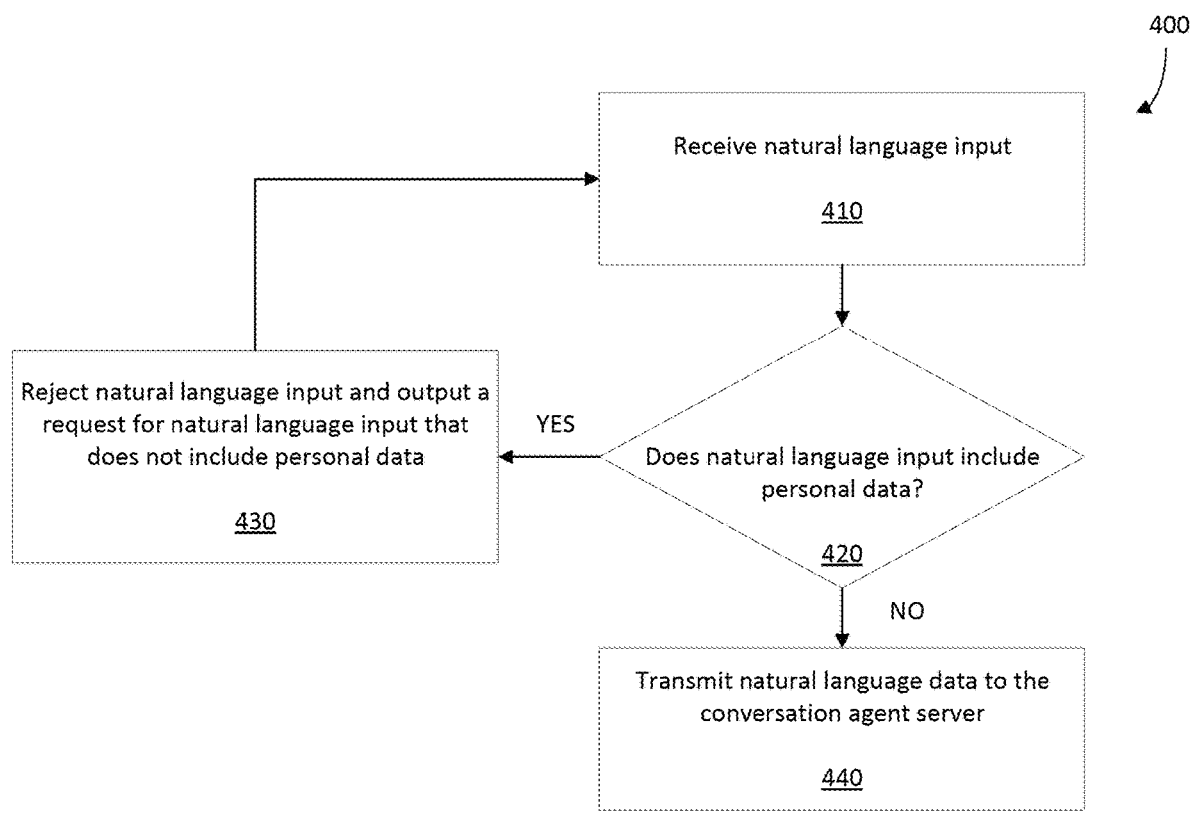
FIG. 4 is a flowchart illustrating a method of analyzing natural language input, in accordance with an example of the present application.

Reference is made to FIG. 4, which illustrates, in flowchart form, a method 400 of analyzing natural language input, in accordance with an example of the present application. The method 400 includes operations that may be carried out by one or more processors of the client device 110 and/or the fulfillment server 130 (FIG. 1). For example, the method 400 may be implemented, at least in part, through processor executable instructions associated with the interactive application 112 (FIG. 1). In some examples, one or more operations may be implemented via processor executable instructions in other applications or in an operating system stored and executed on the client device 110 and/or fulfillment server 130.

Natural language input is received by the client device 110 (step 410). In this embodiment, within the interactive application 112, the bank customer user may provide an acoustic input (e.g., spoken words) or alphanumeric input (e.g., typed words) and the client device 110 may receive the input. As an example, the client device 110 may receive the input "What is the balance of credit card number 1234 5678 9000 0000?"

The natural language input is analyzed by the data scrubbing application to determine if the natural language input includes personal data (step 420).

In the scenario that the received natural language input is in textual format, the textual format may be analyzed by the data scrubbing application. In the scenario that the received natural language input is an acoustic input (e.g., spoken input received from the bank user), the client device 110 may conduct operations to convert the acoustic input into textual format and the textual format may be analyzed by the data scrubbing application 118.

The data scrubbing application may analyze the natural language input to determine if the natural language input includes a plurality of numbers as this may indicate that the natural language input includes, for example, a social security number, a credit card number, etc. When it is determined that the natural language input includes a plurality of numbers, the data scrubbing application determines that the natural language input is likely to include personal data or includes personal data.

Other examples of personal data include names, addresses, etc. As mentioned, personal data may include any data that if misappropriated by an unscrupulous entity, may be used for conducting fraudulent activity that may be injurious to bank account users.

Responsive to determining that the natural language input is likely to include personal data or includes personal data, the data scrubbing application 118 rejects the natural language input and causes the client device 110 to output a message requesting natural language input that does not include the personal data (step 430).

In this embodiment, rejecting the natural language input means that the natural language input is not accepted and thus not transmitted to the conversation agent server 120.

For example, the client device 110 may receive natural language input "What is the balance of credit card number 1234 5678 9000 0000." The data scrubbing application 118 may analyze the natural language input and may identify that a plurality of numbers exist and that this is likely to represent personal data such as a credit card number. As such, the data scrubbing application 118 may cause the client device 110 to output a message such as "Your request includes personal data that is not required to fulfill your request. Please ask the same question, but without the personal data." The method then returns to step 410 where additional natural language input is received.

Responsive to determining that the natural language input does not include personal data, the natural language input is accepted and thus transmitted from the client device 110 to the conversation agent server 120 (step 440).

By analyzing the natural language input prior to sending the natural language input to the conversation agent server 120, natural language input that is likely to include personal data is rejected and thus not sent to the conversation agent server 120. In this manner, The operations of method 400 may be executed by the fulfillment server 130 and/or the client device 110 to minimize providing personal data to the conversation agent server 120 that may be operated by a third party entity to prevent misappropriation of personal data by an unscrupulous entity having access to the conversation agent server 120. Specifically, the operations of method 400 analyze natural language input received by the client device 110 prior to sending the natural language input to the conversation agent server 120. As such, natural language input that is likely to include personal data is rejected and thus not sent to the conversation agent server 120.

Figure 5:
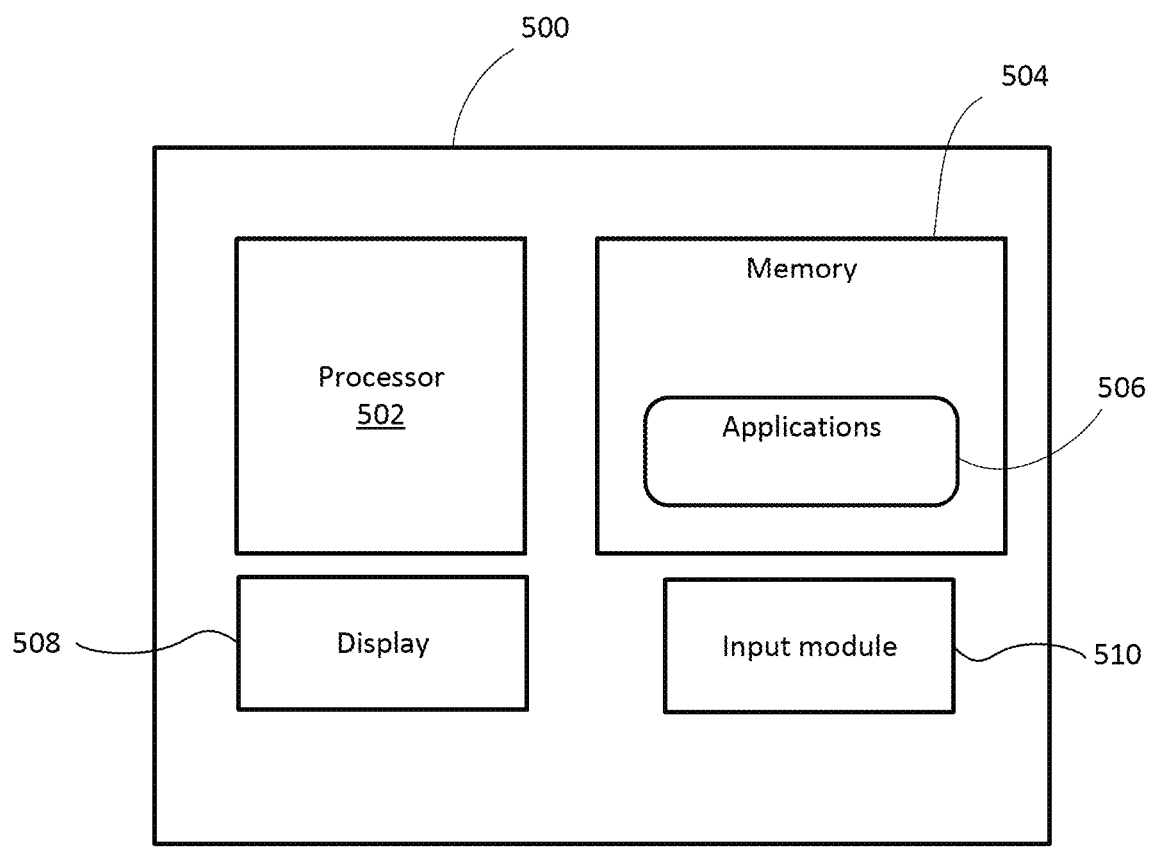
FIG. 5 illustrates, in simplified block diagram form, an electronic device, in accordance with an example of the present application.

Reference is made to FIG. 5, which illustrates, in simplified block diagram form, an electronic device 500, in accordance with an example of the present application. The electronic device 500 can be the client device 110 of FIG. 1. The electronic device 500 includes one or more processors 502, memory 504, and a communications module for providing network capabilities to communicate with other computing devices. The memory 504 may store processor executable software applications 506 that include an operating system to provide basic device operations. The software applications 506 may also include instructions implementing operations of the methods described herein.

The electronic device 500 includes a display interface and/or a display 508. The display 508 can be any suitable display such as a liquid crystal display (LCD), an e-ink/e-paper display, or the like. In some examples, the display 508 is a touchscreen display. The electronic device 500 includes an input module 510 for receiving signals representing commands described in examples herein. In some examples, the input module 510 may be a keyboard device, a touch input device, or a microphone for receiving natural language input from a user of the electronic device 500. In some examples, the electronic device 500 is a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein.

Figure 6:
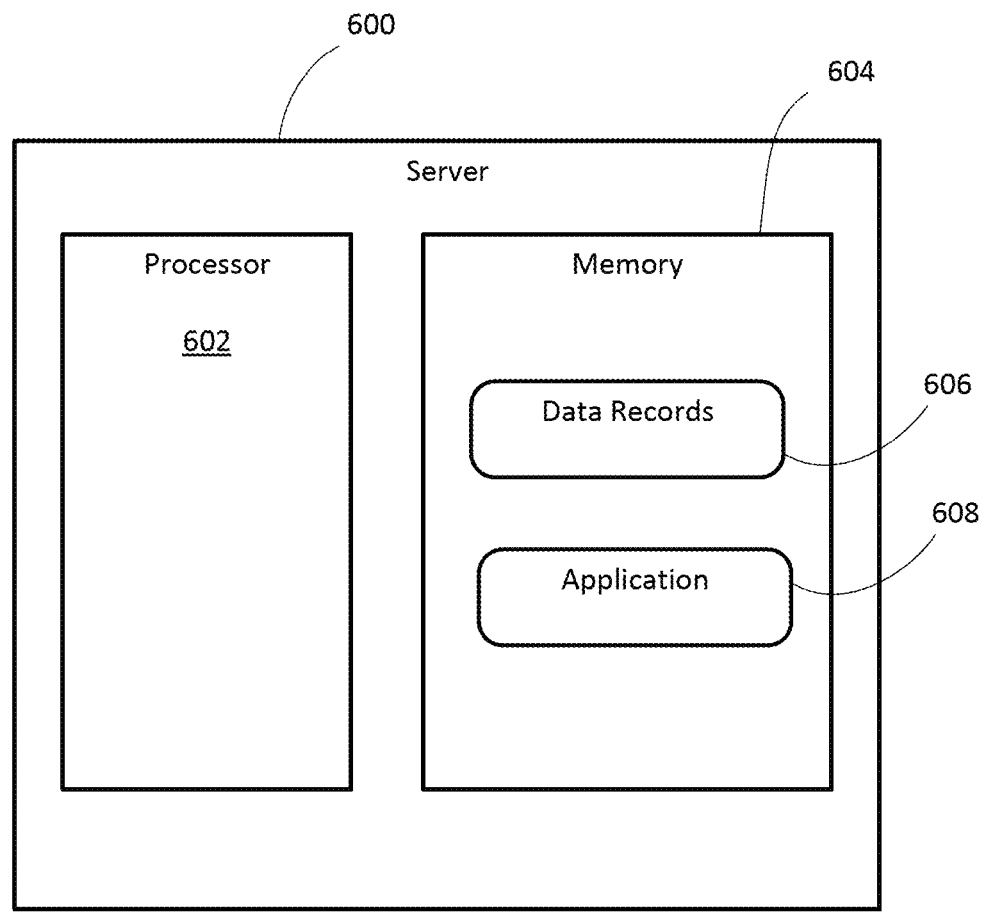
FIG. 6 illustrates, in simplified block diagram form, a server, in accordance with an example of the present application.

Reference is made to FIG. 6, which illustrates, in simplified block diagram form, a server 600, in accordance with an example of the present application. The server 600 may be the conversation agent server 120 of FIG. 1 or the fulfillment server 130 of FIG. 1. The server 600 includes one or more processors 602, memory 604, and a communications module for providing network capabilities to communicate with other computing devices. The memory 604 may include data records 606. In the example of the conversation agent server 120, the data records 606 may include the intent data 124 of FIG. 1. In the example of the fulfillment server 130, the data records 606 may be the client data records 140 or the resource records 136 of FIG. 1.

The memory 604 may also include applications 608 having instructions for performing operations described herein. In an example of the conversation agent server 120, the applications 608 may include the natural language application 122 of FIG. 1. In an example of the fulfillment server 130, the applications 608 may include the fulfillment application 132 of FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A server computer system comprising:
a communications module;
at least one processor coupled with the communications module; and
a memory coupled to the at least one processor and storing processor-executable instructions which, when executed by the at least one processor, configure the at least one processor to:
generate an encryption key pair and provide, via the communications module, a first encryption key of the encryption key pair to a client device;
receive, via the communications module and from a conversation agent server, a fulfillment request that includes at least an intent and a parameter identified from a natural language input transmitted from the client device to the conversation agent server;
analyze at least one of the intent and the parameter of the fulfillment request to determine that the fulfillment request includes a request for personal data and thus requires encryption; and
responsive to determining that the fulfillment request includes the request for personal data and thus requires encryption:
obtain the requested personal data;
encrypt the personal data with a second encryption key of the encryption key pair in an encrypted format that is inaccessible by the conversation agent server such that the conversation agent is prevented from exposure to the personal data; and
provide, via the communications module and to the conversation agent server, the encrypted personal data for transmission to the client device.

2. The server computer system of claim 1, wherein the request for personal data includes a request for at least one of an account balance, a credit balance, an account number, a credit card number, a legal name, an addresses, a social security number, a taxpayer identification number, employment history data, or a birth date.

3. The server computer system of claim 1, wherein the processor-executable instructions, when executed by the at least one processor, configure the at least one processor to:
provide, via the communications module, a data scrubbing application to the client device; and
prior to transmitting the natural language input from the client device to the conversation agent server, analyze, using the data scrubbing application, the natural language input to determine that the natural language input includes a plurality of numbers that represent personal data.

4. The server computer system of claim 3, wherein the processor-executable instructions, when executed by the at least one processor, configure the at least one processor to:
determine that the natural language input includes the plurality of numbers that represent personal data;
responsive to determining that the natural language input includes the plurality of numbers that represent personal data, reject the natural language input; and output, at the client device, a message requesting natural language input that does not include the plurality of numbers that represent personal data.

5. The server computer system of claim 4, wherein the plurality of numbers that represent personal data include atleastoneof a social security number, a credit card number, or an account number.

6. The server computer system of claim 3, wherein the processor-executable instructions, when executed by the at least one processor, configure the at least one processor to:
   determine that thenatural language inputdoes not include the plurality of numbers that represent personal data; and
   responsive to determining that the natural language input does not include the plurality of numbers that represent personal data, transmit, via thecommunications module, the natural language input from the client device to the conversation a gent server.

7. The server computer system of claim 1, wherein the processor- executable instructions, when executed by the at least one processor, configure the at least one processor to:
   receive, at the client device and from the conversation agent server, a response to the natural language input, the response including the encrypted personal data;
   decrypt, using the first encryption key of the encryption key pair, the encrypted personal data; and
   output, at the client device, the decrypted personal data.

8. A computer-implemented method performed by a server computer system, comprising:
   generating an encryption key pair and providing a first encryption key of the encryption key pair to a client device;
   receiving, from a conversation agent server, a fulfillment request that included at least an intent and a parameter identified from a natural language input transmitted from the client device to theconversation agent server;
   analyzing at least one of the intent and the parameter of the fulfillment request to determine that the fulfillment request includes a requestfor personal data and thus requires encryption; and
   responsive to determining that the fulfillment request includes therequest for personal data and thus requires encryption:
      obtaining the requested personal data;
      encrypting the personal data with a second encryption key of the encryption key pair in an encrypted format that is inaccessible by the conversation agent server such that the conversation agent is prevented from exposure to the personal data; and
      providing the encrypted personal data to the conversation a gent server for transmission to the client device.

9. The computer-implemented method of claim 8, wherein the request for personal data includes a request for at least one of an account balance, a credit balance, an account number, a credit card number, a legal name, an addresses, a social security number, a taxpayer identification number, employment history data, or a birth date.

10. The computer-implemented method of claim 8, further comprising:
    providing a data scrubbing application to the client device; and
    prior to transmitting the natural language input from the client device to the conversation agent server, analyzing, using the data scrubbing application, the natural language input to determine that the natural language input includes a plurality of numbers that represent personal data.

11. The computer-implemented method of claim 10, further comprising:
    determining thatthe natural language input includes the plurality of numbers that represent personal data;
    responsive to determining that thenatural language inputincludes the plurality of numbers that represent personal data, rejecting the natural language input; and
    outputting, at theclient device, a message requesting natural language inputthat does not include the plurality of numbers that represent personal data.

12. The computer-implemented method of claim 11, wherein the plurality of numbers that represent personal data include atleastone of a social security number, a credit card number, or an account number.

13. The computer-implemented method of claim 10, further comprising:
    determining thatthe natural language input does not include the plurality of numbers that represent personal data; and
    responsive to determining that the natural language input does not include the plurality of numbers that represent personal data, transmitting the natural language input from the client device to the conversation a gent server.

14. A non-transitory computer readable storage medium comprising computer-executable instructions which, whenexecuted, configure at least one processor of a server computer system to:
    generate an encryption key pair and provide a first encryption key of the encryption key pair to a client device;
    receive, from a conversation agent server, a fulfillment request that includes at least an intent and a parameter identified from a natural language input transmitted from the client device to the conversation a gent server;
    analyze at least one of the intent and the parameter of the fulfillmentrequest to determine thatthe fulfillment request includes a request for personal data and thus requires encryption; and
    responsive to determining that the fulfillment request includes therequest for personal data and thus requires encryption:
       obtain the requested personal data;
       encrypt the personal data with a second encryption key of the encryption key pair in an encrypted format that is inaccessible by the conversation a gent server such that the conversation a gent is prevented from exposure to the personal data; and
       provide the encrypted personal data to the conversation agent server for transmission to the client device.

* * * * *